Sept. 21, 1954  J. N. HELLER ET AL  2,689,551
CRANKCASE BREATHER
Filed Jan. 27, 1951
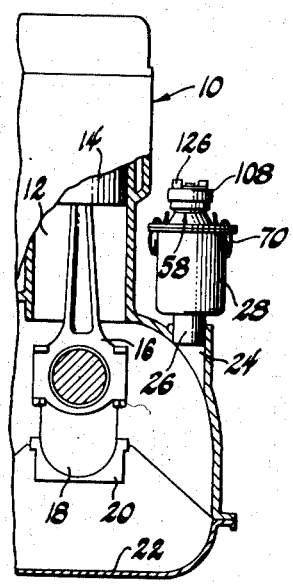
Fig. 1
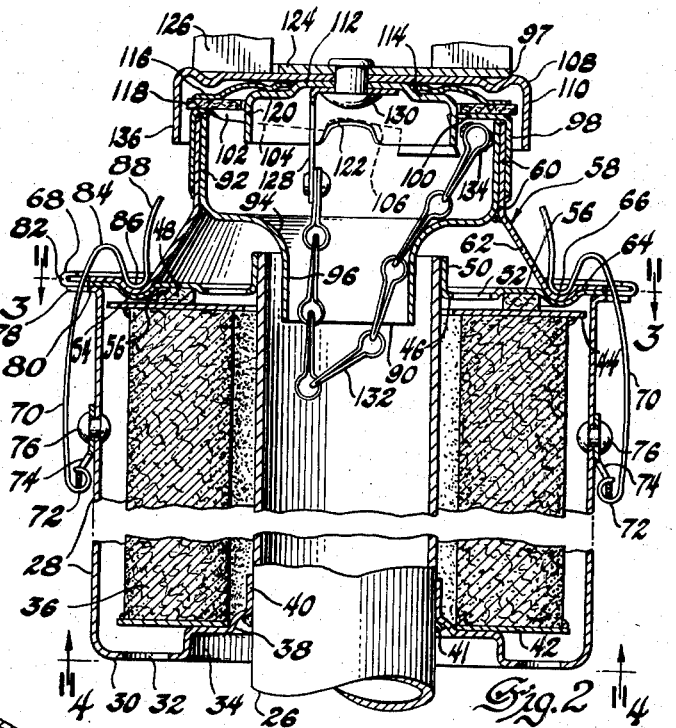
Fig. 2
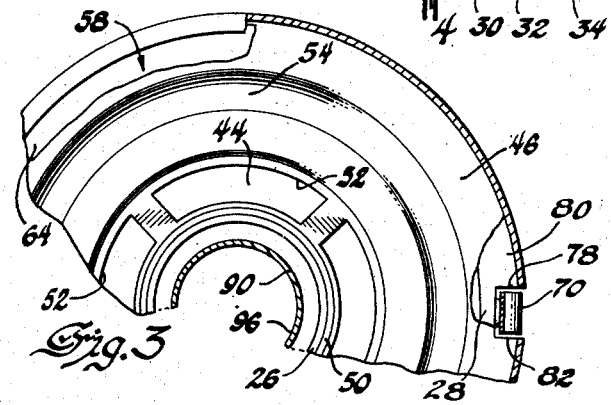
Fig. 3
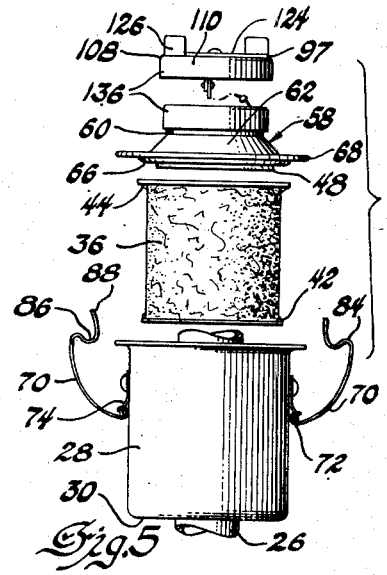
Fig. 4
Fig. 5
Inventors
JOSEPH N. HELLER &
WALLACE M. KENNEDY
By Willits, Helmig & Baillio
Attorneys Patented Sept. 21, 1954

2,689,551

UNITED STATES PATENT OFFICE 2,689,551

CRANKCASE BREATHER

Joseph N. Heller, Flint, and Wallace M. Kennedy, Bloomfield Hills, Mich., assignors to General Motors Corporation, Detroit, Mich., a corporation of Delaware Application January 27, 1951, Serial No. 208,100

17 Claims. (Cl. 121—194)

This invention relates to an improved filter and more particularly an improved air filter and oil filler tube assembly for the crankcase of an internal combustion engine.

The invention is illustrated in connection with an oil filler tube for an internal combustion engine though it will be appreciated that it may be employed in other apparatus where similar problems arise. The filler tube is positioned in the conventional manner extending upwardly from the crankcase oil inlet aperture in the engine block and supports a cup-shaped air filter housing. The bottom of the cup-shaped housing is suitably apertured so that the cup may be placed on the filler tube to surround the tube with the top of the cup-shaped housing approximately level with the top of the filler tube. An annular filter element is positioned in the annular space between the housing and the filler tube. The filter element is sealed to the base of the filter housing and to a plate member positioned at the top of the housing to seal the top of the filter element and to hold the element in the housing. The housing is suitably apertured to provide air passages outside the lower seal communicating with the external surfaces of the annular filter element and the plate member is suitably apertured adjacent the filler tube and within the upper seal to provide air communicating passages with the internal surface of the filter element. A cover member is positioned on top of the plate and is removably secured to the filter housing. The cover member extends upwardly and provides a support for the downwardly extending funnel member which extends into and in spaced relation to the top of the filler tube. A bayonet type cap is secured to the cover member to provide a cap for the filler tube. An air ventilation passage is provided from the crankcase, through the filler tube, beneath the funnel member, through the cover plate, the filter and the housing. Thus the crankcase is in constant communication with the atmosphere through the filter to provide a large supply of clean air to ventilate the crankcase. Thus the cap may be removed in order to pour oil through the filler tube into the engine crankcase and when the cap is replaced the filler tube provides crankcase ventilation through the filter element.

The primary object of the invention is to provide a simplified and compact crankcase ventilation filter and filler tube assembly which provides an accessible closure and filler opening for supplying oil to the crankcase and a large capacity filter for cleaning the crankcase ventilating air passing through the filler tube.

Another object of the invention is to provide in an improved crankcase filler tube and breather filter assembly an improved housing permitting removal and replacement of the filter element and enclosing the filter element to clean all the crankcase ventilating air passing through the filler tube.

Another object of the invention is to provide an improved filter housing adapted to be mounted on the top of the crankcase filler tube and providing an annular cavity for the filter unit having improved sealing means at the lower inner portion and the upper outer portion of the filter element to seal the filter in the air passage between the crankcase and the atmosphere to clear the crankcase ventilating air.

Further objects and advantages of the present invention will be more apparent from the following description of the preferred embodiment of the invention and the accompanying drawing.

Figure 1 is a partial view with parts in section showing the filler pipe and filter assembly mounted on an internal combustion engine.

Figure 2 is a partial sectional view of the filler pipe and filter assembly.

Figure 3 is a partial section of Figure 2 on the line 3—3.

Figure 4 is a partial section of Figure 2 on the line 4—4.

Figure 5 is a view of parts of the assembly removed from the housing.

The invention is illustrated in conjunction with the conventional automotive internal combustion engine 10. This engine has a number of cylinders 12 in which the pistons 14 are reciprocally mounted. The pistons 14 are connected by the usual connecting rod 16 to a crankshaft 18 mounted in bearings 20 supported in the crankcase 22. At the upper portion of the crankcase 22 an outlet opening 24 has a filler tube secured therein to provide an accessible opening to supply oil to the crankcase. In accordance with the present invention, a combined filler tube and crankcase breather filter housing assembly is mounted in the filling aperture 24 of the crankcase 22 so that the filler tube may be used in the conventional manner to supply oil to the crankcase and in addition to supply filtered ventilating air to the crankcase. It will be seen that the complete assembly of a filler tube and a filter housing may be installed on an engine or that the filter housing may be installed on the filler tube of an engine.

The filler tube 26 which is generally of cylindrical shape is positioned in the aperture 24 and is suitably secured to the engine housing by welding or press fit to provide a fluid tight joint. A filter housing 28 having a generally cup-like shape is supported on the filler tube 26. The base of the cup-shaped filter housing has an outer annular portion 30 which has suitable apertures 32 to provide air inlet passages for the crankcase ventilating air. Within the portion 30 the base has an annular raised stepped portion 34 to provide an elevated support for the filter member 36, a frusto spherical portion 38 which engages the lower edge of the filter element 36 in sealing relationship, and an axially directed flange 40 which is secured to the filler tube 26 by suitable means such as welding 41. It will be seen that the flange 40 provides a cylindrical aperture so that the filler tube may pass through the base of the filter housing 28. The flange 40 extends along the filler tube sufficiently to support the housing 28 in fixed axial relation to the filler tube 26. The annular filter element 36 has a lower end plate 42 and an upper end plate 44. These plates are annular in shape and support between them an annular filter element. The element may consist of solid mass of fiber or metal ribbon to provide a depth filter or a continuous strip of foraminous material to provide a surface filter.

The filter element 36 is held in the housing 28 by an annular locating plate 46 which has secured on its lower face a ring seal 48 which engages the top of the filter plate 44 to seal the located plate 46 to the filter element. The annular locating plate 46 has at its inner periphery an integral, axially directed cylindrical flange 50 which fits about the upper end of the filler tube 26. The plate 46 is perforated to provide an annular series of outlet apertures 52 surrounding and adjacent to the flange 50 just inside of the gasket 48 to provide a passage for the crankcase ventilating air. The plate 46 has an annular depressed portion or groove 54 and an annular flat seating portion 56.

A cover support member 58 is positioned on top of the filter housing 28. The cover member 58 has a generally cylindrical top portion 60, a frusto-conical mid-portion 62 and an annular lower portion 64. At the bend between the frusto-conical mid-portion 62 and the annular portion 64 the cover member 58 has an annular groove 66 which fits into the groove 54 of the plate 46. The cover plate 46 and the cover member 58 are secured together by an integral flange 68 on the outer periphery of the cover plate 46 which is rolled over and on top of the cover support 58. The cover plate and cover member assembly is secured to the filter housing by a pair of spring steel fasteners 70. The fasteners 70 have eyes at the bottom end 72 which pivotally mount the fastener on the pivot bracket 74. The pivot bracket is a conventional small rectangularly apertured plate which is suitably secured to the filter housing by suitable means such as the rivet 76. The fastening member 70 extends upwardly through a slot 78 in the upper flange 80 of the filter housing 28 and a slot 82 in both the filter plate 46 and the cover member 58. The fastening member 70, by extending through these slots, positions and holds the cover plate and cover member 58 against rotation relative to the filter housing 28. The fastening member 70 has, adjacent its upper end, a reverse bend 84 which provides a downwardly extending U-shaped portion 86 which fits into the recess 66 to hold the cover member and cover plate assembly on the filter housing. The free end 88 of the fastening member 70 may extend above the bend 84 to provide means to grip the fastener and release it from the groove 66. This release may be accomplished by pulling it away from the filter housing assembly. A funnel member 90 having an upper cylindrical portion 92 is secured and sealed within the upper cylindrical portion 60 of the cover support member 58. The funnel member 90 has depending from the cylindrical portion 92 an intermediate portion 94 extending inwardly above the upper end of the filler pipe 26 and connecting with a downwardly extending cylindrical spout portion 96 which has a smaller diameter than the filler pipe 26 and extends into the filler pipe.

The cover member 58 is provided with a cap or closure 97 of the bayonet type which is secured to a bayonet flange member 100. In order to secure the annular bayonet flange to the cover member 58, it has an integral cylindrical portion 98 extending down from the outer edge of the flange 100 and fitting and secured to the outside of the cylindrical portion 60 of the cover member 58. The inwardly directed bayonet flange 100 is cut away at certain points 102 to provide an entrance for the bayonet member and has a downwardly extending ramp 104 with detent recess 106. The cap 97 consists of a cup member 108 having an external flange 110 extending downwardly around and spaced from the outside of the cylindrical flange 98. A smaller cup member 112 is concentrically nested within the cup 108. The inner cup 112 has an annular depressed portion 114 adjacent the outer perimeter which provides a space between the inner cup 112 and the outer cup 108 for the annular gasket spring 116 which presses the ring gasket 118 against the flange 100. The inner cup member 112 has an external cylindrical flange 120 which supports the integrally formed and radially extending bayonet members 122. A finger bar 124 is secured on the top side of the cup 108 and has integral finger grips 126 at each end bent upwardly from the bar 124 to provide means for turning the cap 97. A chain fastener 128 is positioned on the under side of the inner cup 112. This cap assembly 97 consists of the chain fastener 128, the inner cup 112, the cover cup 108 and the hand grip bar 124 which are all secured together by suitable means such as the rivet 130. Rotation between the parts of the cap assembly is prevented by the rivet pressure or an interlocking arrangement. A chain 132 connects the chain bracket 128 to the inner wall of the funnel member 90 by suitable securing means such as weld 134.

Though it is believed that the above detailed description of the detailed features of construction of this embodiment of the invention will make clear the mode of operation and function of the invention, it is believed desirable to briefly outline these features of the invention. The invention may be manufactured as a unit including the filter housing and cover member assembly either by itself or attached to the filler tube before it is assembled on the vehicle. However, it is contemplated that the filter housing and closure assembly could be made as a unit for assembly on vehicles with a conventional filler tube and closure gap.

Referring to Figure 2 it will be seen that the cup-shaped filter housing 28 is secured to the filler tube 26 by a flange 40 on the lower wall of the housing. The annular filter element 36 fits within the annular space between the housing and filler tube and divides the space centrally by sealing engagement at the bottom with the spherical seat 38 and at the top side with the resilient seal 48 on the plate 46. Thus there is provided between the housing 28 and the outer surface of the filter element 36 an air inlet space which communicates with the atmosphere through the air passage apertures 32. Between the inner surface of the filter 36 and the filler tube 26, there is an air space which communicates with the filler tube through the apertures 52. It will be seen that the air after passing through the aperture 52 rises above the top of the filler tube 26 and passes downwardly inside the filler tube and outside the lower portion 96 of the funnel member. Thus the crankcase space is permitted a free ventilation passage through the filler tube and filter assembly to the atmosphere.

When adding oil to the crankcase the filler cap 97 may be removed in the conventional way by gripping the finger grips 126 and rotating the cap 97 to open the bayonet joint. Then the oil may be poured into the opening 92 of the funnel member. This opening is made wider than the filler pipe for easy pouring. It will be noted that the funnel member has a larger opening than the filler tube and also extends downwardly below the top of the filler tube to prevent oil from entering the filter and blocking the air passage through the filter end and the filter housing.

The filter elements 36 may be readily replaced when they have served and collected sufficient foreign matter to impair their efficiency. In order to replace a filter element the spring fasteners 70 are first snapped backwardly by gripping the end portion of finger grip portion 88 and lifting the fasteners on the top of the cover plate 58. The cover assembly 136 consisting of the cover support 58, the locating plate 46, the funnel member 90, the bayonet member and the closure member 97 are removed as a unit as illustrated in Figure 5. Then the old filter element 36 is removed and a new filter element is positioned in the annular housing and pushed downwardly on the spherical sealing surface 38 to provide a seal between the base of the filter housing and the filter element. The cover assembly portion of the filter housing is then placed on the housing with the flange 50 surrounding the filler pipe end to guide the assembly into position. When this assembly is seated the seal 48 engages the top of the filter element 36 to provide a seal. The spring fasteners 70 are positioned on top of the cover plate assembly with the U-shaped end 86 positioned in the recess 66 to secure the cover assembly to the housing 28.

It will be understood from the foregoing description that the invention is not concerned with the specific top and bottom or upper and lower relationship of the several parts. These terms have been used for convenience in referring to and identifying parts so located in the drawing with the filler pipe in a vertical position. However, it will be appreciated that the filler pipe end can be located in other positions.

The detailed description of a preferred embodiment of the invention is not to be considered to limit the invention since many modifications of structure may be made by those skilled in the art within the scope of the invention as defined in the appended claims.

We claim:

1. In a filter assembly, a housing having inlet and outlet openings, said housing having a base, a tapered annular seat on said base, a filter element having top and bottom annular palte members, one edge of said bottom annular plate member engaging said seat to seal the filter to said housing, said housing having a sealing plate closing the top of said filter housing, and a resilient gasket between and in contact with said sealing plate and said top plate of said filter element.

2. In a filter assembly, a housing having inlet and outlet openings, said housing having a base, a tapered annular seat on said base, a filter element having top and bottom annular plate members, the inner edge of said bottom annular plate member engaging said seat to seal the filter to said housing, said housing having a sealing plate closing the top of said filter housing, and a resilient gasket between and in contact with said sealing plate and said top plate of said filter element.

3. In a filter assembly, a housing having inlet and outlet openings, said housing having a base, a tapered annular seat on said base, a filter element having top and bottom annular plate members, one edge of said bottom annular plate member engaging said seat to seal the filter to said housing, said housing having a sealing plate closing the top of said filter housing, a resilient gasket between and in contact with said sealing plate and said top plate of said filter, one of said inlet and outlet openings being located in said base and communicating with the outside of said filter element, and the other of said openings being located in said sealing plate and communicating with the interior of said filter element.

4. In a filter housing assembly, a filler pipe, a housing having a base, said housing supported and sealed to said filler pipe, a combined cover assembly for said filter housing and filler tube consisting of a plate for said housing sealing the top of said housing to said filler tube, a cover member secured to said plate, said plate and said cover member being permanently secured together, said assembly being releasably secured to said housing, fluid passage apertures in said filter housing and said plate, and filter means between said apertures.

5. In a filter housing assembly, a filler pipe, a housing having a base, said housing supported and sealed to said filler pipe, a combined cover assembly for said filter housing and filler tube consisting of a plate for said housing sealing the top of said housing to said filler tube, a cover member secured to said plate, and a funnel member supported by said cover member and extending into said filler tube, said plate and said cover member and said funnel being permanently secured together, said assembly being releasably secured to said housing, fluid passage apertures in said filter housing and said plate, and filter means between said apertures.

6. In a filter housing assembly, a filler pipe, a housing having a base, said housing supported and sealed to said filler pipe, a combined cover assembly for said filter housing and filler tube consisting of a plate for said housing sealing the top of said housing to said filler tube, a cover member secured to said plate, and a closure for said cover member, said plate and said cover member being permanently secured together and said closure releasably secured thereto to provide a cover assembly, said assembly being releasably secured to said housing, fluid passage apertures in said filter housing and said plate, and filter means between said apertures.

7. In a filter housing assembly, a filler pipe, a housing having a base, said housing supported and sealed to said filler pipe, a combined cover assembly for said filter housing and filler tube consisting of a plate for said housing sealing the top of said housing to said filler tube, a cover member secured to said plate, a funnel member supported by said cover member and extending into said filler tube, and a closure for said funnel and cover member, said plate and said cover member and said funnel being permanently secured together and said closure releasably secured thereto to provide a cover assembly, said assembly being releasably secured to said housing, fluid passage apertures in said filter housing and said plate, and filter means between said apertures.

8. In a filter housing assembly, a filler pipe, a housing having a base, said housing surrounding said filler pipe, said base supported and sealed to said filler pipe, a combined cover assembly for said filter housing and filler tube consisting of a plate for said housing sealing the top of said housing to said filler tube, a cover member secured to said plate, a funnel member supported by said cover member and extending into said filler tube, said plate, said cover member and said funnel being permanently secured together, said assembly being releasably secured to said housing, fluid passage apertures in said filter housing and said plate, and filter means between said apertures.

9. In a filter housing assembly, a filler pipe, a housing having a base, said housing surrounding said filler pipe, said base supported and sealed to said filler pipe, a combined cover assembly for said filter housing and filler tube consisting of a plate for said housing sealing the top of said housing to said filler tube, a cover member secured to said plate, said plate and said cover member being permanently secured together, said assembly being releasably secured to said housing, fluid passage apertures in said filter housing and said plate, and filter means between said apertures.

10. In a filter housing assembly, a filler pipe, a housing having a base, said housing surrounding said filler pipe, said base supported and sealed to said filler pipe, a combined cover assembly for said filter housing and filler tube consisting of a plate for said housing sealing the top of said housing to said filler tube, a cover member secured to said plate, a funnel member supported by said cover member and extending into said filler tube, a closure for said funnel and cover member, said plate, said cover member and said funnel being permanently secured together, said assembly being releasably secured to said housing, fluid passage apertures in said filter housing and said plate, and filter means sealed to said housing between said apertures.

11. A filler cap and vent filter housing, a filler tube, a cup-shaped housing having an apertured base positioned on said filler tube with the filler tube passing through the aperture, said base being sealed to said filler tube, means to secure the housing to said filler tube, the top of said housing extending substantially to the top of said filler tube, an annular filter positioned centrally in said housing and sealed to the base of said housing, a sealing plate at the top of said housing sealing the top of said housing to the filter, apertures in said housing providing an air passage to one side of said filter and apertures in said sealing plate providing an air passage to the other side of said filter, a cover member sealed to said plate outside said apertures and extending upwardly to provide a filler opening, a funnel positioned in said opening and extending down into and spaced from said filler tube, a cap for said filler opening, means to secure said sealing plate, cover member and funnel together as a unit, spring clamps to releasably secure said unit to the housing, cooperating recesses in said unit and housing engaged by said spring clamp to prevent relative rotation.

12. A filler cap and vent filter housing, a filler tube, a cup-shaped housing having an apertured base positioned on said filler tube with the filler tube passing through the aperture, said base being sealed to said filler tube, means to secure the housing to said filler tube, the top of said housing extending substantially to the top of said filler tube, an annular filter positioned centrally in said housing and sealed to the base of said housing, a sealing plate at the top of said housing sealing the top of said housing to the filter, apertures in said housing providing an air passage to one side of said filter and apertures in said sealing plate providing an air passage to the other side of said filter, a cover member sealed to said plate outside said apertures and extending upwardly to provide a filler opening, a funnel positioned in said opening and extending down into and spaced from said filler tube, a cap for said filler opening, means to secure said sealing plate, cover member and funnel together as a unit, and means to releasably secure said unit to the housing.

13. A filler cap and vent filter housing, a filler tube, a cup-shaped housing having an apertured base positioned on said filler tube with the filler tube passing through the aperture, said base being sealed to said filler tube, means to secure the housing to said filler tube, the top of said housing extending substantially to the top of said filler tube, an annular filter positioned centrally in said housing and sealed to the base of said housing, a sealing plate at the top of said housing sealing the top of said housing to the filter, apertures in said housing providing an air passage to one side of said filter and apertures in said sealing plate providing an air passage to the other side of said filter, a cover member sealed to said plate outside said apertures and extending upwardly to provide a filler opening, a funnel positioned in said opening and extending down into said filler tube, an air passage between said funnel and said filler tube, a cap for said filler opening, means to secure said sealing plate, cover member and funnel together as a unit, and means to releasably secure said unit to the housing.

14. A filler cap and vent filter housing, a filler tube, a cup-shaped housing having an apertured base positioned on said filler tube with the filler tube passing through the aperture, said base being sealed to said filler tube, means to secure the housing to said filler tube, the top of said housing extending substantially to the top of said filler tube, a filter positioned centrally in said housing, a plate at the top of said housing sealing the top of said housing, apertures in said housing providing an air passage to one part of said filter and apertures in said plate providing an air passage to the other part of said filter, a cover member sealed to said plate outside said apertures and extending upwardly to provide a filler opening, a funnel positioned in said opening and extending down into and spaced from said filler tube, a cap for said filler opening, means to secure said sealing plate, cover member and funnel together as a unit, spring clamps to releasably secure said unit to the housing.

15. A filler cap and vent filter housing, a filler tube, a cup-shaped housing having an apertured base positioned on said filler tube with the filler tube passing through the aperture, means to support the housing on said filler tube, an annular filter positioned centrally in said housing, a top plate at the top of said housing sealing the top of said housing, means sealing and enclosing said housing between said top plate and base, apertures in said housing providing an air passage to one part of said filter and apertures in said sealing plate providing an air passage to the other part of said filter, a cover member sealed to said plate outside said apertures and extending upwardly to provide a filler opening, a funnel positioned in said opening and extending down into and spaced from said filler tube, a cap for said filler opening, means to secure said sealing plate, cover member and funnel together as a unit, spring clamps to releasably secure said unit to the housing, cooperating recesses in said unit and housing engaged by said spring clamp to prevent relative rotation.

16. A filler cap and vent filter housing, a filler tube, a cup-shaped housing having an apertured base positioned on said filler tube with the filler tube passing through the aperture, said base being sealed to said filler tube, means to secure the housing to said filler tube, the top of said housing extending substantially to the top of said filler tube, a filter positioned centrally in said housing, a plate at the top of said housing sealing the top of said housing, apertures in said housing providing an air passage to one part of said filter and apertures in said plate providing an air passage to the other part of said filter, a cover member sealed to said plate outside said apertures and extending upwardly to provide a filler opening, a funnel positioned in said opening and extending down into and spaced from said filler tube, a cap for said filler opening, means to secure said sealing plate, cover member and funnel together as a unit, and means to releasably secure said unit to the housing.

17. A filler cap and vent filter housing, a filler tube, a cup-shaped housing having an apertured base positioned on said filler tube with the filler tube passing through the aperture, said base being sealed to said filler tube, means to secure the housing to said filler tube, the top of said housing extending substantially to the top of said filler tube, a filter positioned centrally in said housing, a plate at the top of said housing sealing the top of said housing, apertures in said housing providing an air passage to one part of said filter and apertures in said plate providing an air passage to the other part of said filter, a cover member sealed to said plate outside said apertures and extending upwardly to provide a filler opening, a funnel positioned in said opening and extending down into and spaced from said filler tube, a cap for said filler opening, means to secure said sealing plate, cover member and funnel together as a unit, spring clamps to releasably secure said unit to the housing, cooperating recesses in said unit and housing engaged by said spring clamp to prevent relative rotation.

References Cited in the file of this patent

UNITED STATES PATENTS

| Number | Name | Date |
|---|---|---|
| 1,755,624 | Yount | Apr. 22, 1930 |
| 1,829,401 | Kamrath | Oct. 27, 1931 |
| 2,137,054 | Kamrath | Nov. 15, 1938 |
| 2,170,074 | Hewitt | Aug. 22, 1939 |
| 2,331,332 | Latta | Oct. 12, 1943 |
| 2,389,140 | Enblom | Nov. 20, 1945 |
| 2,517,518 | Williams | Aug. 1, 1950 |